United States Patent [19]

Escola et al.

[11] Patent Number: 5,432,929
[45] Date of Patent: Jul. 11, 1995

[54] STORAGE SUBSYSTEM HAVING A MODIFIABLE KEY-LOCK

[75] Inventors: Dennis R. Escola, Gilroy; Steven D. Gerdt, San Jose; Barrie N. Harding, San Jose; Paul W. Hunter, San Jose; Lloyd R. Shipman, Jr., San Jose, all of Calif.

[73] Assignee: International Business Machines Corporation, Armonk, N.Y.

[21] Appl. No.: 942,700

[22] Filed: Sep. 9, 1992

[51] Int. Cl.6 ............................................. G06F 15/40
[52] U.S. Cl. ............................... 395/600; 364/DIG. 1
[58] Field of Search ................................ 395/600, 650

[56] References Cited

U.S. PATENT DOCUMENTS

| | | | |
|---|---|---|---|
| 4,128,874 | 12/1978 | Pertl et al. | 364/DIG. 1 |
| 4,380,798 | 4/1983 | Shannon et al. | 364/200 |
| 4,471,163 | 9/1984 | Donald et al. | 178/22.08 |
| 4,574,350 | 3/1986 | Starr | 364/DIG. 1 |
| 4,725,946 | 2/1988 | Prange et al. | 364/DIG. 1 |
| 5,261,063 | 9/1993 | Kohn et al. | 395/375 |
| 5,265,245 | 11/1993 | Nordstrom et al. | 395/600 |
| 5,274,809 | 12/1993 | Iwasnki et al. | 395/650 |
| 5,327,556 | 7/1994 | Mohan et al. | 395/600 |

FOREIGN PATENT DOCUMENTS 2188177A of 0000 United Kingdom .

OTHER PUBLICATIONS

Wagner, "Shared Resource Locking Controls", IBM Technical Disclosure Bulletin, vol. 25, No. 7B, Dec. 1982.

Primary Examiner—Thomas G. Black
Assistant Examiner—Peter Y. Wang
Attorney, Agent, or Firm—Baker, Maxham, Jester & Meador

[57] ABSTRACT

A data storage and retrieval system is described having one or more key-lock storage areas which can be modified under the control of commands received from an attached computer. Each key-lock is stored in nonvolatile data storage. A key-lock contains a key field and a lock field. The contents of the key-lock are read and modified based on commands received from the computer. The command to write a new key-lock value specifies a first key and a proffered key-lock. The subsystem reads the current key-lock from nonvolatile storage, then compares the first and current keys. When the first and current keys are equal, the proffered key-lock is stored in the key-lock storage area of nonvolatile data storage, thereby replacing the original key-lock. When the keys are not equal, the key-lock is left unmodified and status data is transmitted to the computer indicating that the update request has failed. The subsystem will send the original key-lock value to the computer upon demand. One alternative embodiment of the invention has means for designating a predetermined unlocked key value as indicative of the key-lock being unlocked.

18 Claims, 2 Drawing Sheets

STORAGE SUBSYSTEM HAVING A MODIFIABLE KEY-LOCK

TECHNICAL FIELD

The present invention relates to methods and systems in the field of storage subsystem design and more particularly to methods of managing software locks stored in nonvolatile storage devices such as disk subsystems.

BACKGROUND OF THE INVENTION

Typical disk data storage and retrieval systems (disk systems) include a controller connected to one or more disk files. The controller may be a physically separate device or it may be integrated with the disk file in a single device. Integrated controller/disk file systems are sometimes called disk subsystems. The disk files contain the actual data storage hardware. A controller provides the external interface to one or more computers. The term disk system is used herein to refer to the combination of one or more disk files with one or more controllers whether they are in separate devices or integrated in a single device. Typically the computer is operating under the control of a multiprogramming operating system, such as any one of IBM's well-known MVS family of operating systems, which allows multiple programs (or tasks) to execute in an interleaved manner so that the disk system is, in effect, shared by multiple programs. Since multiple computers may be connected to a disk system, the sharing of the disk system can also occur between computers. To operate the disk system a program running on the computer sends commands and data to the controller. The connection between the controller and the computer allows for two-way communication so that the controller can also send status information and data to the computer. The status information returned by the controller includes return codes indicative of the success or failure of the commands. Typical disk systems have means for detecting errors in read and write actions as well as various other functions. A typical controller includes one or more microprocessors and one or more memory means into which a special software program, typically called microcode or firmware, is loaded. The actions taken by the controller in response to commands usually involve the microprocessor running or executing some pad of the microcode. The computer to which the controller is adapted to be connected typically includes a component or subsystem called a channel subsystem which interfaces to the controller. In a channel environment the commands sent to the controller may be called channel commands or channel command words (CCW). Channel commands are typically communicated to the controller in a list of connected commands which are called a channel command program or command chain (CCC). The channel commands in the channel program are said to be chained together. Typically a command chain has exclusive access to the disk system only while the chain is executing. A computer program seeking to access the disk system may have to send several command chains to achieve a desired result. The command chains from one program may be interleaved with chains from other programs by a single computer's operating system or by the different computers. When a program must execute a critical sequence of commands, i.e., a sequence of commands which must not be interleaved with similar commands from another program or computer, actions must be taken to limit access by other programs to the data that is being modified until the critical commands have completed successfully. In the case where a controller is connected to multiple computers, a special command may be used which causes the controller to RESERVE the designated disk file for the exclusive use of the requesting computer. This prevents other computers which are sharing the disk file from accessing the disk file until the release command is issued, but does not limit access by other programs running on the same computer. In order to limit disk access by other programs on the same computer, additional access limitation schemes must be used. Software locks and enqueuing are well known in the ad for this purpose, but have the inherent weakness that programs may bypass them and defeat the limitation. Since the software locks in the prior art are written in RAM or as user data on disk, any program having access to the RAM or disk may intentionally or inadvertently overwrite them destroying the effect of the lock.

In U.S. Pat. No. 4,128,874 erroneous data transfer from a computer is prevented by comparing a key value specified as pad of an output word with a predetermined lock value stored in hardware lock network. If the key value and lock value do not match, the data field of the output word is not sent to the output data lines of the digital computer.

In U.S. Pat. No. 4,725,946 the system checks the contents of a word of a semaphore to determine if the semaphore has been seized to either check the status of a resource or to change the semaphore to reflect a change in the availability of the resource. The contents of a second word of the first semaphore are checked when the check of the first word indicates that the first semaphore has not been seized to determine if the first resource is available to be used by a circuit in the computer system that is requesting access to the first resource. Data is stored in the first word indicating the semaphore has been seized. A location in the memory is addressed where the first word of the first semaphore is stored using the identity of the first resource. The first word has specific data written in it when the first semaphore has not been seized to determine the availability status of the first resource and when the first resource is available for use by any of the circuits. The presence of the first circuit identity in the first word prevents others of the circuits from checking the semaphore. Access to the first resource is granted by the first circuit when the check of the second word indicates that the first resource available for use.

In Yamagishi, et al., Great Britain patent number 2,188,177, several host data processors are provided with a communication unit interconnecting the processors. A file unit stores a common data resource shared by the processors, the resource being logically divided into groups associated with the respective hosts. A host is thus assigned to each group of the data resource as master of that group. A lock request to the common data resource is sent to a lock manager on the host which is the master of the data resource group to be locked, and exclusive control is performed.

In U.S. Pat. No. 4,471,163 a software protection system enables a single program lock to protect products emanating from different owners. The system controls the operation of a computer according to a particular program where a program lock interfaces with the computer. The operation is authorized in response only to a selected relation between a number in the program, a number in the lock, and a third number. The third number is a 'key' supplied to the lock which bears a selected relation to both the program number and lock number. The system includes translation and memory devices and a correlation device. The use is to prevent computer programs from being copied or used without authorization.

In U.S. Pat. No. 4,574,350 a program controller for a resource-shared computer system has a hardware lock unit for limiting concurrent use of memory by processors. The arrangement includes means for determining the idle or busy status of the resource and means for granting a selected one of the requesting devices access to the idle resource. A lockable resource is prevented from being accessed by a device that is not a current owner and the current owner may be prevented from accessing the resource more than a predetermined number of times. The arrangement frees the rest of the system from having to run a software lock program and thus eliminate the overhead associated therewith.

In U.S. Pat. No. 4,380,798 a semaphore register includes ownership bits and has an internal ownership bit. The register is for use in a peripheral controller and includes a semaphore bit which when not set indicates the availability of a shared resource, an internal ownership bit which when set indicates ownership of the resource by a peripheral controller and an external ownership bit which when set indicates ownership of the resource by a host processor. If the semaphore is clear, upon receipt of a read signal from the peripheral controller, the semaphore bit and the internal ownership bit are set. Upon receipt of a read signal from the host processor, the semaphore bit and the external ownership bit are set.

R. E. Wagner in an article entitled *Shared Resource Locking Controls* (IBM Technical Disclosure Bulletin, 12-82, pp. 3762-3764) suggests, in high-level form, a logical lock which can be associated with a storage area or resource. "Structural information" associated with the logical lock is maintained by the users of the lock. The status of the lock indicates the state of the lock in terms of usage, such as free, held shared, or held exclusive. The locks are manipulated by two peripheral commands or CCWs named LOCK and UNLOCK and have identical format. The commands contain the address of a buffer area which contains what Wagner calls "the key field" which he defines as the LOCK identifier as well as the structural data in the case of an UNLOCK or the area into which the structural data is to be placed in the case of a LOCK. The execution of the LOCK command varies based on the current status of the requested lock. If the lock is available, execution of the LOCK command causes the lock to be set to the: requested state, the setting of the current owner, and the transfer of the structural data to the area specified by the command. If the lock is not available, execution of the LOCK command causes the request to be queued. When the lock becomes available, the queued requesters are serviced on a first-in first-out basis. The execution of the UNLOCK command causes the lock status to be changed to free for this given user. If the user freeing the lock had exclusive use of the lock, the associated structural data supplied by the freer replaces the structural data which had been previously associated with the lock.

The prior art does not provide any completely satisfactory way to store software locks on a disk system or to ensure that commands from different programs attempting to update the locks may not be inadvertently interleaved resulting in the loss of the integrity of the locks.

SUMMARY OF THE INVENTION

The present invention is a data storage and retrieval system having one or more key-lock storage areas which can be modified under the control of commands received from an attached computer. Each key-lock is stored in nonvolatile data storage. A key-lock contains M bits of data with a key field of N bits of data with M being equal to or larger than N. The contents of the key-lock are read and modified based on commands received from the computer. The command to write a new key-lock value specifies a first key containing N bits of data and a proffered key-lock containing M bits of data. The subsystem reads the original key-lock from nonvolatile storage into RAM after the command has been received, and then compares the first and original keys. When the first and original keys are equal, the proffered key-lock is stored in the key-lock storage area of nonvolatile data storage, thereby replacing the original key-lock. When the first and original keys are not equal, the original key-lock is left unmodified and status data is recorded indicating that the update request has failed due to the nonequality of the keys. The subsystem will send the original key-lock value and the status data to the computer upon demand. Preferably the data storage and retrieval system has separate nonvolatile storage areas for user data and system data, with the system data being protected from user read and write commands. The key-locks should be stored in the system data storage area. Optionally the subsystem has a readable timer and a time stamp is stored together with the new key-lock whenever it is updated. One alternative embodiment of the invention has means for testing the original key for equality to a predetermined unlocked key value indicative of the key-lock being unlocked. When the unlocked value is present the proffered new key-lock value may be written without regard to the contents of the key in the command.

DETAILED DESCRIPTION OF THE INVENTION

Figure 1:
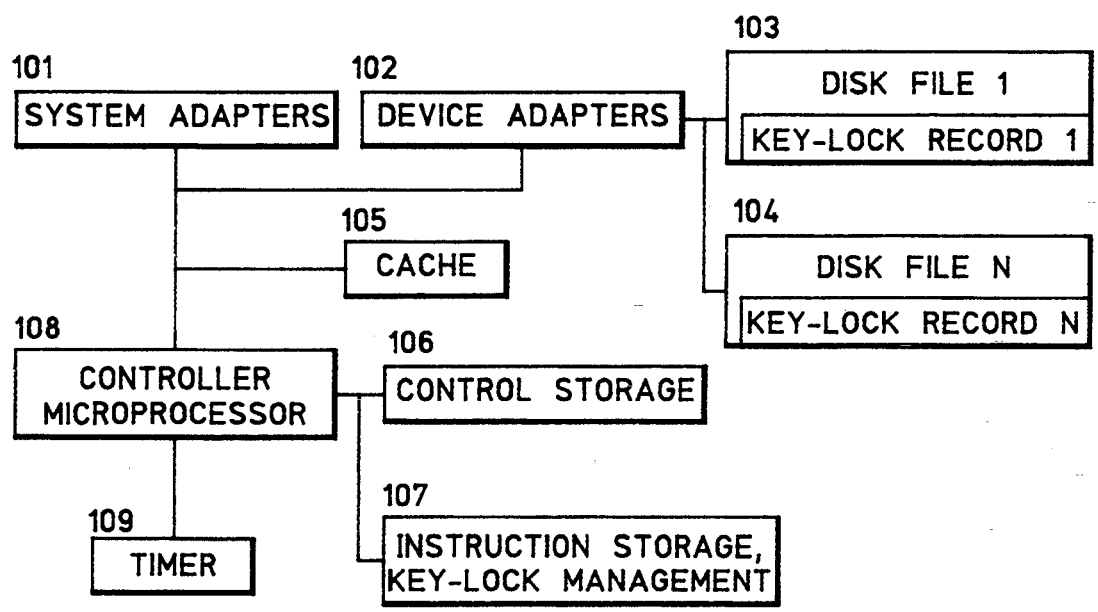
FIG. 1 is a block diagram of the components of a disk subsystem utilizing the invention.

The detailed embodiment of the invention which will be described is a controller for a disk subsystem and tile completed disk subsystem. The broad components of the system of the invention will be described with reference to FIG. 1. The interfaces to the one or more computers using the disk subsystem are called system adapters 101. The interfaces to the one or more disk files contained in the disk subsystem are called device adapters 102. The disk files 103, 104 contain the heads and actual magnetic or opto-magnetic disks. Any type of nonvolatile storage devices are acceptable. In some data storage systems the disk files are separately packaged components and the other components shown in FIG. 1 are called the subsystem (or cluster) controller. The cache 105 for the system is shown, but is optional. The supervisory function of the system is performed by the controller microprocessor 108. The instructions to be executed by the microprocessor are stored in the instruction storage 107 which may be RAM or ROM. The system has a timer 109 which is used to generate time stamps. When RAM is used for the instruction storage, the microcode will be loaded into the RAM from one of the disk files when the disk subsystem is initialized. The control storage 106 is RAM in which the controller may store temporary data indicative of the status of operation, etc. The key-lock management of the invention is controlled by action of the microprocessor executing specially written microcode stored in the instruction, storage. Some or all of the functions described below for the key-lock management could also be implemented using standard electrical engineering techniques.

Figure 2:
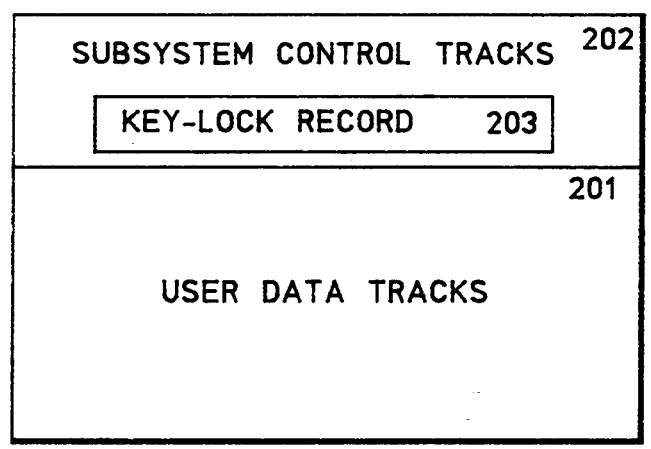
FIG. 2 is a block diagram of the track layout of a disk file used in the invention.

Each disk file contains one or more platters or disks on which data is recorded. The data is written in concentric circles on the disks which are called tracks. Reference is made to FIG. 2. Most of the tracks are allocated to user data 201, but a few tracks on each disk file are allocated for subsystem control data as subsystem control tracks 202. The user data may be arbitrarily written and read upon commands from the computers. The subsystem control data is closely controlled by the controller and is not directly readable or writeable by user programs. The key-lock records of the invention are stored on one or more of the subsystem control tracks and are protected from being written or read as user data. Special disk subsystem commands are defined which detail how the key-lock area is read and updated. The embodiment of the invention described herein allocates one key-lock field on each disk file, but any number of key-locks may be placed on any number of disk files without varying from the invention. The location and number of key-locks used will vary with the function for which they are used.

In one embodiment the key-locks may be used as pad of a media maintenance strategy for the disk subsystem which is implemented in the disk system support programs which execute on one or more of the attached computers. Since media maintenance is performed on a per device (disk file) basis, one key-lock per device is logical for this use. Since each disk file is assigned a device address which is used in the Start I/O (SIO), the designation of a disk file also uniquely identifies a key-lock. In an alternative embodiment the disk subsystem could have a number of key-locks which would be independent of the number of disk files. Commands updating the key-locks in such a case would have to identify the specific key-lock being addressed. Many addressing schemes could be used. A simple example would be that if there were 100 key-locks, they could be addressed by including a key-lock selector number from one to a hundred in the command.

The number of bits or bytes allocated for a key-lock record is arbitrary so long as the total number of bits is sufficient to support a key field and a lock field. The key field should preferably be large enough to reduce the odds that two randomly selected keys will be identical. The detailed embodiment uses 12 bytes for the key and 500 bytes for the lock field for a total of 512 bytes in the key-lock. The key portion of the key-lock may appear anywhere in the key-lock, but the first or last positions are preferable. The initial state of the key-lock on a device may be undetermined, since provision is made for reading the key-lock regardless of its contents. Since it is the key portion of the key-lock which is used by the subsystem to determine the processing steps, the lock portion could be omitted in an alternative embodiment of the invention without loss of the primary benefits of the invention.

It is conventional for the disk subsystem to accept commands (CCWs) and data from a computer and return status and data to the computer. These commands may be chained together which allows multiple commands to be transmitted with a single Start I/O (SIO) operation. Some commands are architected to require that they be chained to other commands. Each of the commands in the set of disk subsystem commands is conventionally assigned an identifying hexcode. One class of commands relating to subsystem function are initiated with a Perform Subsystem Function (PSF) command which is arbitrarily assigned the hexcode of '27' in applicants' detailed embodiment. Which PSF subcommand is to be executed is determined by parameters which are transmitted along with the PSF command and specify the particular order to be performed. The format of the PSF command is X'27', the address in memory in the requesting computer where the order parameters and the byte count of the order parameters are stored.

The updating of the key-lock is accomplished by a PSF order named "Compare and Swap" (C&S) which is arbitrarily assigned the hexcode of '87'. In the detailed embodiment PSF parameters are:

| Bytes | Contents |
| --- | --- |
| 0 | Order: X'87' |
| 1 | Flag Byte: X'00' |
| 2–3 | Unused; must be zero |
| 4–15 | Comparison Key |
| 16–527 | Key-Lock to be written |

The flag byte and the unused bytes are arbitrary and may be omitted in other embodiments. When the C&S order is received the subsystem reads the key-lock from the device that has been specified in the SIO. If errors are detected during the reading, then the operation completion status is set to X'01' and the exception status is set to X'1C' and the process stops. If the read is successful, the designated key field, i.e., the first 12 bytes of the key-lock, are compared with the comparison key in bytes 4–15 of the PSF parameters. If the keys are not equal, then the operation completion status is set to X'01' and the exception status is set to X'0D' and the process is stopped. If the keys are equal, then the key-lock in bytes 16–527 are written to the disk to replace the old key-lock. The .operation completion status is set to X'00' indicating success. In the detailed embodiment the subsystem's timer value is written along with the key-lock to record when the update occurred. This is an optional step.

The reading of the key-lock, operation completion status code and exception status code is accomplished by a disk subsystem command named "Read Subsystem Data" (RSD) which is arbitrarily assigned the hexcode of '3E'. When an RSD is chained to a C&S command, the full 512 bytes of the key-lock as they were prior to the C&S command are returned to the computer using the standard path for returning data to the requesting computer. Additional optional data such as the subsystem's timer value that was written when the key-lock was last updated may also be read and transferred along with the key-lock. When a program attempts to update the key-lock and the operation fails because the keys are not equal, the program may need to read the key-lock to determine the proper course of action. The RSD command returns the contents of the key-lock prior to the C&S command. If the C&S command was successful the program may not need the prior contents of the key-lock and may ignore it. If the C&S has failed, then the key-lock should contain sufficient information to enable the program to ascertain whether another program has control over the key-lock or whether the program seeking to acquire control over the key-lock simply needs to update its key and try again. In the detailed embodiment, the RSD command has other uses when chained to other PSF commands which are unrelated to the invention. The format of the data returned by the RSD command chained to a C&S in the detailed embodiment is as follows:

| Bytes | Contents |
| --- | --- |
| 0–1 | Length X'21C' |
| 2 | Format X'81' |
| 3 | Message Code X'02' |
| 4–7 | Unused; must be zeroes |
| 8 | Flags X'00' |
| 9 | Operation Completion Status Code: |
|  | X'00' Successful |
|  | X'01' Completed with exceptions (see byte 10) |
|  | X'02' Failed |
| 10 | Exception Status Code: |
|  | X'0D' Compare and Swap keys not equal |
|  | X'1C' Compare and Swap read failure |
| 11 | Zeroes |
| 12–19 | Current Subsystem timer |
| 20–27 | Subsystem timer value written at last update |
| 28–539 | Key-lock value prior to C&S |

Figure 3:
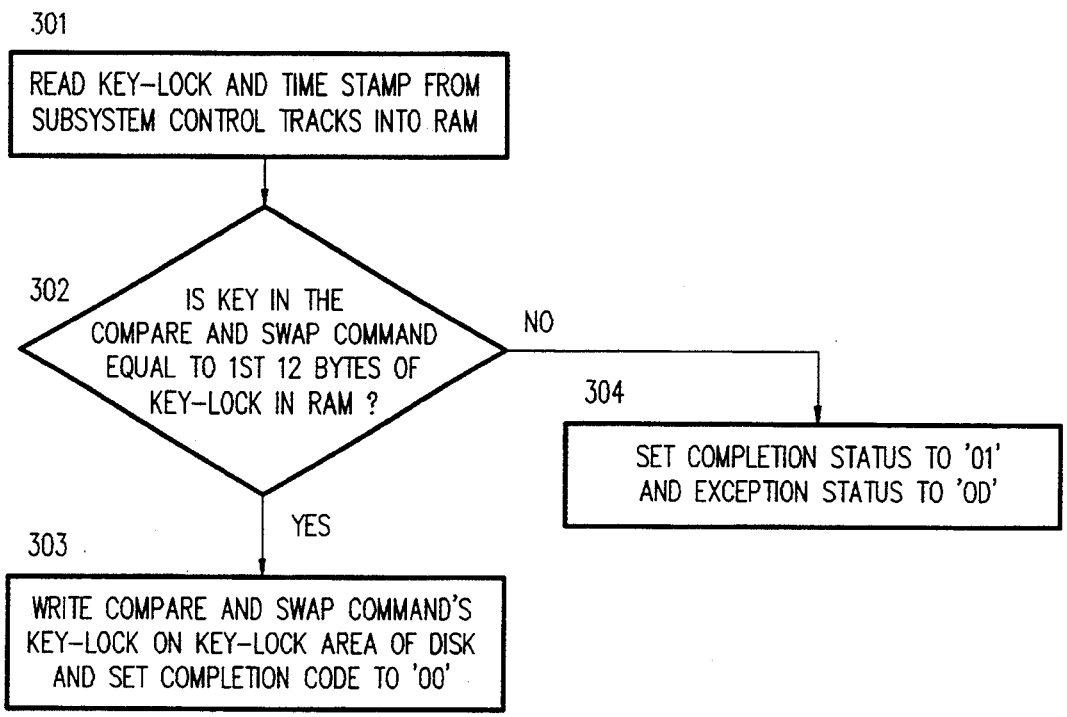
FIG. 3 is an overview of the method of processing a Compare and Swap command in an embodiment of the invention.
Figure 4:
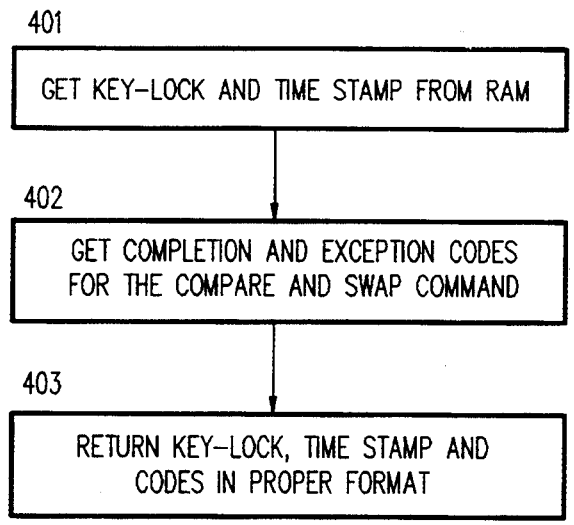
FIG. 4 is an overview of the method of processing a Read Subsystem Data command in an embodiment of the invention.

When the computer executes a conventional SIO instruction, the channel system transmits the SIO to the disk subsystem. The subsystem then uses the channel to read the channel command chain (CCC) and the associated data from the memory of the computer. The CCWs in the CCC are then sequentially executed. An embodiment of the invention's C&S CCW processing method is illustrated in FIG. 3. The SIO instruction identifies by address which of the plurality of disk files (or disk drives) is being referenced. The subsystem reads the key-lock from the selected disk file by reading into RAM the preassigned key-lock area in the subsystem control area on the disk 301. The subsystem timer value written at the time of the last update of the key-lock (the time stamp) is read along with the key-lock. The key area of the key-lock record (e.g., the first 12 bytes) is compared with the key presented ill the C&S CCW 302. If the two fields are equal, then the key-lock field in the C&S and the current subsystem timer value are written to the reserved area of the disk and the completion status is set to '00' 303. If the two fields are not equal, then the completion status is set to '01' and the exception status is set to '0D' 304. If the subsystem is unable to complete any of the required steps in reading and/or writing the key-lock, the CCW will fail and the completion status is set to '02'. The exception status will be set to a value indicative of the type of failure, e.g., '1C' is used for key-lock read failure. The completion and exception codes are returned to the computer by way of a chained RSD CCW, but note that the exception code is only defined when the completion code is '01'. The normal subsystem processing continues thereafter. The processing of a RSD CCW chained to a C&S is illustrated in FIG. 4. The RSD instruction gets the contents of the key-lock and time stamp from RAM where the previous C&S operation stored them 401. This represents the value of the key-lock prior to the execution of the C&S. If the C&S command succeeded, then the current contents of the key-lock on the disk will be different from the value in RAM. The C&S completion status and the exception status previously set by the C&S command are read 402. The 'old' value of the key-lock, the time stamp and the status bytes are then placed into the predetermined format and returned to the requesting computer using the conventional technique 403. The applicants' detailed embodiment of the invention does not provide a method for reading the value of the key-lock without first having executed a C&S. An alternative embodiment could provide for the equivalent of the RSD which would read the key-lock without regard to a C&S command. When the invention's key-lock system is used by media maintenance programs and the key-lock is acquired by a media maintenance program on one of the computers, identifying data may be written into the key-lock specifying that a media maintenance program has acquired the key-lock, which computer the program is running on, and any other detailed information which might be useful such as the areas of the disk which are being used and progress information. The nature of this information is outside of the applicants' invention and may vary from application to application. The programs using the key-lock can write whatever information is useful into the key-lock. The programs may also work out whatever conflict resolution is desired in the event that a program acquires the key-lock and fails to release it. A convention could be established, for example, that if the acquiring program had filed to release the key-lock after a fixed amount of time, then other programs could overwrite the key-lock. The key point is that the key-lock is a general purpose tool which can be used in an unlimited number of ways.

A simple practical example of use of the key-lock will be described. Assume that computers C1 and C2 are connected to a disk subsystem using key-locks and computers C1 and C2 are running programs P1 and P2 respectively. P1 and P2 are similar programs which must update and read common information stored in the user data tracks of a disk file DF1. After completing a transaction, both P1 and P2 need to increment a common transaction counter which is stored on DF1. Neither P1 nor P2 knows the current value of the common counter, so each must first read the common counter, add one to it and then write it back to DF1. If no locks or equivalent means are used, then it is possible that both P1 and P2 could read the common counter value very close in time and each read the value to be X. Each could then write a new common counter value as X+1 which would be in error because the correct value is X+2. Using the key-lock of the invention the correct result could be achieved as follows. Assume that each program using the key-lock has been written to return the key value to "0000" after it finishes the critical operation. Four byte keys are arbitrarily assumed in this example. P1 and P2 send a Compare and Swap command to the subsystem containing DFI using the comparison key "0000" and new keys of "C1P1" and "C2P2" respectively. Whichever command reaches the subsystem first will be processed first, but since the subsystem inherently processes only one command at a time they cannot be processed simultaneously. Assuming that the P1 command is executed first and that the key is, in fact, "0000", then the subsystem will change the key to "C1P1" as well as writing the rest of the key-lock to whatever data is supplied in P1's C&S command. If the P2 C&S is executed immediately thereafter it will fail because the key is no longer "0000" as specified in P2's C&S. This is P2's signal that it cannot update the common counter and must wait until it's C&S command executes successfully. After P1's C&S has successfully "seized" the key-lock P1 can safely read and update the common counter to X+1. When P1 rewrites the key as "0000", then P2 will read the common counter as X+1 and update it to X+2. Thus, the programs using the shared resource are provided the ability to coordinate their activities without communicating directly with each other. In the foregoing example the common counter can be replaced with any common data shared between programs or tasks. The programs can be media maintenance programs, database programs, operating system programs, or the like.

In the applicant's detailed embodiment of the invention, the key-lock is treated as unlocked by the subsystem when an arbitrarily selected value of the key is stored in the key-lock. When the key is all zeroes the subsystem by-passes the comparison step in which the old key is compared with the key presented in the C&S and simply writes the new key-lock value even though the key presented in the C&S is not all zeroes. The use of the basic key-lock invention does not require that this feature be implemented.

Using the foregoing specifications the invention may be implemented using standard programming and engineering techniques. The resulting program(s) may be stored on disk, diskettes, memory cards, ROM or any other memory device. For execution, the program(s) may be copied into the RAM of the system. One skilled in the art of computer science will easily be able to combine the software or microcode created as described with appropriate general purpose or special purpose disk system hardware to create a controller and a disk subsystem embodying the invention. While the preferred embodiment of the present invention has been illustrated in detail, it should be apparent that modifications and adaptations to that embodiment may occur to one skilled in the ad without departing from the scope of the present invention as set forth in the following claims.

What is claimed is:

1. A data storage and retrieval system having a nonvolatile data storage, means for transmitting and receiving data to and from a computer, a processor and a RAM comprising:
   nonvolatile data storage including a nonvolatile data storage area;
   means for storing in the nonvolatile data storage area an original key-lock containing M bits of data, the original key-lock having an original key field of N bits of data with M being equal to or larger than N;
   means for receiving data from the computer specifying a first key containing N bits of data and a proffered key-lock containing M bits of data with M being equal to or larger than N;
   means for reading the original key-lock from the nonvolatile data storage area into RAM after the first key has been received;
   means for comparing the first and original keys after the original key-lock has been read into RAM;
   means, responsive to the means for comparing, for storing the proffered key-lock in the nonvolatile data storage area, thereby replacing the original key-lock, when the first and original keys are equal; and
   means, responsive to the means for comparing, for transmitting data to the computer indicative of the nonequality, when the first and original keys are not equal.

2. The system of claim 1 further comprising means for transmitting the original key-lock data to the computer.

3. The system of claim 2 wherein the means for transmitting the original key-lock data is responsive to receipt of a read key-lock command from the computer.

4. The system of claim 1, the data storage and retrieval system having separate nonvolatile data storage areas for user data and system data, the system data being protected from user read and write commands, wherein the means for storing the original key-lock stores the original key-lock in the system data storage area.

5. The system of claim 1, the data storage and retrieval system having a readable timer from which time stamps are derived, further comprising:
   means for reading a previously stored time stamp together with the original key-lock; and
   means for storing a new time stamp derived from a current timer reading together with the proffered key-lock in the nonvolatile data storage area.

6. The system of claim 1, further comprising:
   means for testing the original key for equality to a predetermined unlocked key value indicative of the key-lock being unlocked, with equality producing a positive signal, the means for testing being activated when the means for reading the original key-lock has placed the original key-lock into RAM; and
   means, responsive to the positive signal from the means for testing, for storing the proffered key-lock in the nonvolatile data storage area and by-passing the activation of the means for comparing and means responsive to the means for comparing.

7. A controller for a data storage and retrieval system having a nonvolatile data storage, means for transmitting and receiving data to and from a computer, a processor and a RAM, comprising:
   means for storing in a key-lock storage area of a non volatile storage device an original key-lock containing M bits of data, the original key-lock having an original key field of N bits of data with M being equal to or larger than N;
   means for receiving data from the computer specifying a first key containing N bits of data and a proffered key-lock containing M bits of data with M being equal to or larger than N;
   means for reading the original key-lock from the key-lock storage area of the nonvolatile storage device into RAM after the first key has been received;
   means for comparing the first and original keys after the original key-lock has been read into RAM;
   means, responsive to the means for comparing, for storing the proffered key-lock in the key-lock storage area of the nonvolatile storage device, thereby replacing the original key-lock, when the first and original keys are equal; and means, responsive to the means for comparing, for transmitting data to the computer indicative of the nonequality, when the first and original keys are not equal.

8. The controller of claim 7 further comprising means for transmitting the original key-lock data to the computer.

9. The controller of claim 8 wherein the means for transmitting the original key-lock data is responsive to receipt of a read key-lock command from the computer.

10. The controller of claim 7, the data storage and retrieval system having separate nonvolatile storage areas for user data and system data, the system data being protected from user read and write commands, wherein the means for storing the original key-lock stores the original key-lock in the system data storage area.

11. The controller of claim 7, the data storage and retrieval system having a readable timer from which time stamps are derived, further comprising:

means for reading a previously stored time stamp together with the original key-lock; and means for storing a new time stamp derived from a current timer reading together with the proffered key-lock in the key-lock storage area of the nonvolatile storage device.

12. The controller of claim 7, further comprising:

means for testing the original key for equality to a predetermined unlocked key value indicative of the key-lock being unlocked, with equality producing a positive signal, the means for testing being activated when the means for reading the original key-lock has placed the original key-lock into RAM; and means, responsive to the positive signal from the means for testing, for storing the proffered key-lock in the key-lock storage area of nonvolatile the data storage device and bypassing the activation of the means for comparing and means responsive to the means for comparing.

13. A method of operating a data storage and retrieval system having a processor, a RAM and a nonvolatile data storage, and adapted to transmit and receive data to and from a computer, the method comprising the steps of:

storing in a key-lock storage area of a nonvolatile data storage device an original key-lock containing M bits of data, the original key-lock having an original key portion containing N bits of data with M being equal to or larger than N;

receiving data from the computer specifying a first key containing N bits of data and a proffered key-lock containing M bits of data with M being equal to or larger than N;

reading into RAM the original key-lock from the key-lock storage area in the nonvolatile data storage device; and comparing the first and original keys and if the keys are equal, storing the proffered key-lock in the key-lock storage area of the nonvolatile data storage device, thereby replacing the original key-lock, or if the first and original keys are not equal, transmitting data to the computer indicative of the nonequality.

14. The method of claim 13 further comprising the step of transmitting the original key-lock data to the computer.

15. The method of claim 14 wherein the step of transmitting the original key-lock data occurs in response to a read key-lock command received from the computer.

16. The method of claim 13, the data storage and retrieval system having separate nonvolatile storage areas for user data and system data, the system data being protected from user read and write commands, the step of reading the original key-lock further comprising reading the system data storage area.

17. The method of claim 13, the data storage and retrieval system having a readable timer from which time stamps are derived, further comprising the steps of:

reading a previously stored time stamp together with the original key-lock; and storing a new time stamp derived from a current timer reading together with the proffered key-lock in the nonvolatile storage area.

18. The method of claim 13, further comprising the additional step, executed prior to the comparing step, of testing the original key for equality to a predetermined unlocked key value indicative of the key-lock being unlocked, and if the original key and unlocked key are equal, storing the proffered key-lock in the key-lock storage area of nonvolatile data storage and omitting the comparing step, or if the original and unlocked keys are not equal, continuing to the comparing step.

* * * * *

UNITED STATES PATENT AND TRADEMARK OFFICE
CERTIFICATE OF CORRECTION

PATENT NO. : 5,432,929
DATED : July 11, 1995
INVENTOR(S) : Escola et al

It is certified that error appears in the above-indentified patent and that said Letters Patent is hereby corrected as shown below:

Column 11, line 41, please delete the second occurrence of "the" and please add --the-- between "of" and "nonvolatile".

Signed and Sealed this

Tenth Day of October, 1995

BRUCE LEHMAN

*Attest:*

*Attesting Officer*    Commissioner of Patents and Trademarks